(12) United States Patent
Shaw et al.

(10) Patent No.: US 8,924,781 B2
(45) Date of Patent: Dec. 30, 2014

(54) POWER CAPPING BASED ON GENERATOR CAPACITY

(75) Inventors: Mark E. Shaw, Sammamish, WA (US); Badriddine Khessib, Redmond, WA (US); Bryan Kelly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 13/173,852

(22) Filed: Jun. 30, 2011

(65) Prior Publication Data

US 2013/0007515 A1    Jan. 3, 2013

(51) Int. Cl.
| | |
|---|---|
| G06F 11/00 | (2006.01) |
| G06F 11/30 | (2006.01) |
| G06F 1/30 | (2006.01) |
| G06F 1/32 | (2006.01) |
| G06F 11/20 | (2006.01) |

(52) U.S. Cl.
CPC .............. G06F 1/30 (2013.01); G06F 11/3062 (2013.01); G06F 1/3206 (2013.01); G06F 11/2015 (2013.01); G06F 1/324 (2013.01); G06F 1/3268 (2013.01); Y02B 60/1246 (2013.01)
USPC .......................................................... 714/14

(58) Field of Classification Search
CPC ... G06F 1/3287; G06F 1/3293; G06F 1/3296; G06F 1/30; G06F 1/305
See application file for complete search history.

(56) References Cited

U.S. PATENT DOCUMENTS

| | | | |
|---|---|---|---|
| 6,567,769 | B2 | 5/2003 | Chang |
| 6,633,823 | B2 | 10/2003 | Bartone et al. |

(Continued)

FOREIGN PATENT DOCUMENTS

| | | |
|---|---|---|
| CN | 101068387 A | 11/2007 |
| CN | 201238200 Y | 5/2009 |
| CN | 201868944 U | 6/2011 |
| JP | 4277638 B2 | 6/2009 |

OTHER PUBLICATIONS

Jiang, et al., "Enabling autonomic power-aware management of instrumented data centers", Retrieved at << http://ieeexplore.ieee.org/stamp/stamp.jsp?tp=&arnumber=5160976 >>, IEEE International Symposium on Parallel & Distributed Processing, May 23-29, 2009, 8 pages.

(Continued)

*Primary Examiner* — Michael Maskulinski
(74) *Attorney, Agent, or Firm* — Jim Sfekas; Kate Drakos; Micky Minhas

(57) ABSTRACT

A data center may use generators for backup power, where the backup generators are able to serve less than the maximal power load of the data center. The use of generators that can serve less than the maximal power load may be recognized by, and addressed by, the power policy for the data center. When utility power is lost, the power policy manager may detect that the data center is switching to generator power, and may have knowledge of the capacity of those generators. If the capacity is less than the maximal power load of the data center, the power policy manager may shed load by throttling equipment in the data center to lower power levels. The policy may specify which pieces of equipment are to be throttled. When utility power is restored, the throttling of the equipment may be removed by the power policy manager.

20 Claims, 4 Drawing Sheets

(56) References Cited

U.S. PATENT DOCUMENTS

| | | | |
|---|---|---|---|
| 6,901,522 B2 | 5/2005 | Buch | |
| 7,117,377 B2 | 10/2006 | Hagiwara et al. | |
| 7,418,608 B2 | 8/2008 | Kumar et al. | |
| 7,421,599 B2 | 9/2008 | Bahali et al. | |
| 7,549,067 B2 * | 6/2009 | Tolliver | 713/320 |
| 7,653,825 B1 | 1/2010 | White et al. | |
| 7,783,909 B2 | 8/2010 | Hatasaki et al. | |
| 7,895,455 B2 * | 2/2011 | Green et al. | 713/300 |
| 8,006,112 B2 * | 8/2011 | Munjal et al. | 713/324 |
| 8,140,868 B2 * | 3/2012 | Felter et al. | 713/300 |
| 8,392,729 B2 | 3/2013 | Egan et al. | |
| 8,504,861 B2 * | 8/2013 | Sawai et al. | 713/340 |
| 8,595,515 B1 * | 11/2013 | Weber et al. | 713/300 |
| 2003/0023885 A1 | 1/2003 | Potter et al. | |
| 2003/0084359 A1 | 5/2003 | Bresniker et al. | |
| 2008/0028246 A1 | 1/2008 | Witham | |
| 2009/0070611 A1 | 3/2009 | Bower, III et al. | |
| 2009/0228726 A1 | 9/2009 | Malik et al. | |
| 2009/0234512 A1 | 9/2009 | Ewing et al. | |
| 2009/0235097 A1 | 9/2009 | Hamilton et al. | |
| 2009/0282274 A1 | 11/2009 | Langgood et al. | |
| 2009/0287949 A1 | 11/2009 | Bradicich et al. | |
| 2009/0319650 A1 | 12/2009 | Collins et al. | |
| 2010/0026092 A1 | 2/2010 | Iida et al. | |
| 2010/0211669 A1 | 8/2010 | Dalgas et al. | |
| 2010/0211810 A1 | 8/2010 | Zacho | |
| 2010/0223085 A1 | 9/2010 | Gauthier et al. | |
| 2011/0029793 A1 * | 2/2011 | Horvath et al. | 713/320 |
| 2011/0119514 A1 | 5/2011 | Kim et al. | |
| 2011/0156480 A1 | 6/2011 | Park | |
| 2012/0068541 A1 * | 3/2012 | Anderson | 307/66 |
| 2012/0146417 A1 * | 6/2012 | Rasmussen et al. | 307/64 |
| 2012/0331317 A1 | 12/2012 | Rogers et al. | |

OTHER PUBLICATIONS

Rag Havendra, et al., "No 'power' struggles: coordinated multi-level power management for the data center", Retrieved at << http://www.hpl.hp.com/techreports/2007/HPL-2007-194.pdf>>, Proceedings of the 13th international conference on Architectural support for programming languages and operating systems, internal accession date: Dec. 20, 2007, publication date: Mar. 1-5, 2008, 13 pages.

"International Search Report and Written Opinion of the International Searching Authority", Mailed Date: Feb. 28, 2013, Application No. PCT/US2012/042423, Filed Date: Jun. 14, 2012, 9 pages.

"Statement Filed Pursuant to the Duty of Disclosure", filed in U.S. Appl. No. 13/168,983, filed Jun. 26, 2011, Statement filed Jun. 26, 2011, 3 pages.

"Statement Filed Pursuant to the Duty of Disclosure", filed in U.S. Appl. No. 13/173,852, filed Jun. 30, 2011, Statement filed on Jul. 3, 2011, 3 pages.

Notice of Allowance in U.S. Appl. No. 13/168,983, filed Jun. 26, 2011, Notice of Allowance dated Apr. 3, 2013, 14 pages.

Notice of Allowance in U.S. Appl. No. 13/168,983, filed Jun. 26, 2011, Notice of Allowance dated Jul. 24, 2013, 11 pages.

"International Search Report and the Written Opinion of the International Searching Authority", Mailed Date: Nov. 29, 2012, Application No. PCT/US2012/036859, Filed Date: May 8, 2012, 9 pages.

Wang, et al., "MIMO Power Control for High-Density Servers in an Enclosure", Retrieved at <<http://ieeexplore.ieee.org/stamp/stamp.jsp?tp=&arnumber=5406511>>, IEEE Transactions on Parallel and Distributed Systems, vol. 21 No. 10, Oct. 2010, pp. 1412-1426.

"Power In, DollarsOut: How to Stem the Flow in the Data Center", Retrieved at <<http://download.microsoft.com/download/3/0/2/3027D574-C433-412A-A8B6-5E0A75D5B237/Svr_Pwr_ITAdminV2.docx>>, Jul. 2, 2010, pp. 1-40.

Search report in Chinese Patent Application No. 201280032474.3, Report dated Aug. 25, 2014, Report mailed Sep. 2, 2014, 2 pages.

* cited by examiner

POWER CAPPING BASED ON GENERATOR CAPACITY

BACKGROUND

Data centers are facilities that house servers and other types of computing equipment. For example, the servers that provide online service for a retailer, a bank, a school, etc., may be housed in a data center. Because of the nature of the equipment housed in data centers, and because of the types of services that this equipment is used to provide, the expectations for uptime at a data center are very high. While there may be occasional outages due to maintenance or software failure, it is generally expected that abrupt interruptions of electrical service to the equipment will not occur. In some cases, the equipment and the software running on the equipment are not designed to fail gracefully in the event of electrical service interruption. Rather, the data center is expected to provide continuous electrical power to the equipment so that failures due to electrical service interruptions do not occur.

In order to maintain continuous electrical service, data centers are generally equipped with backup electrical systems. These backup systems may include generators and Uninterruptable Power Supplies (UPS). In general, UPS's provide short-term power in the event of a utility power service interruption, in order to provide enough time to switch power over to the backup generators. Thus, for much of the duration of an extended utility power outage, power is provided by the generators. In theory, a data center may have enough generator capacity to replace completely the utility power that has been lost. However, equipping a data center with that amount of generator power is expensive, and thus may not be economically feasible in certain situations. Moreover, generator power is not exactly the same as the utility power that it replaces, since the types of generators that can be used on-site may be more susceptible to impedance issues than the utility power that the generators replace.

SUMMARY

A data center can be run on under-sized generator capacity if the power policy for the information technology (IT) equipment (e.g., servers, network devices, storage devices, etc.) takes into account the amount of generator capacity that is available, and whether the center is currently running on generator or utility power. When a data center switches over from utility power to generator power, the IT equipment at the data center (as well as any other equipment) may be throttled in order to reduce its power consumption. Thus, if the generators are not able to satisfy the full power load of the data center, throttling reduces the power consumption to match the capacity of the generators. When the data center is restored to utility power, throttling is removed.

The change from utility power to generator power may occur for various reasons—e.g., utility service outage, maintenance on the data center's connection to the electrical utility, a scheduled test on the ability of the generators to carry the data center's load, or for any other reason. If the change to generator power occurs unexpectedly (e.g., in the case of an unplanned electrical service outage), the changeover may occur in the following manner. Upon loss of utility power, a UPS (or plural UPS's) for the data center continue delivery of power to the equipment. The generators then start, while the UPS delivers power. The power policy manager for the servers has knowledge of the available generator capacity, so, while the UPS delivers power, the power policy manager throttles the IT equipment (or any other equipment) down to a level that can be handled by the generators. When the generators are ready, they are brought online, with the equipment having been throttled back down to a power consumption level for which that the generators can supply power. When utility power is restored, power for the data center is switched back to utility power, and the throttle may be removed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
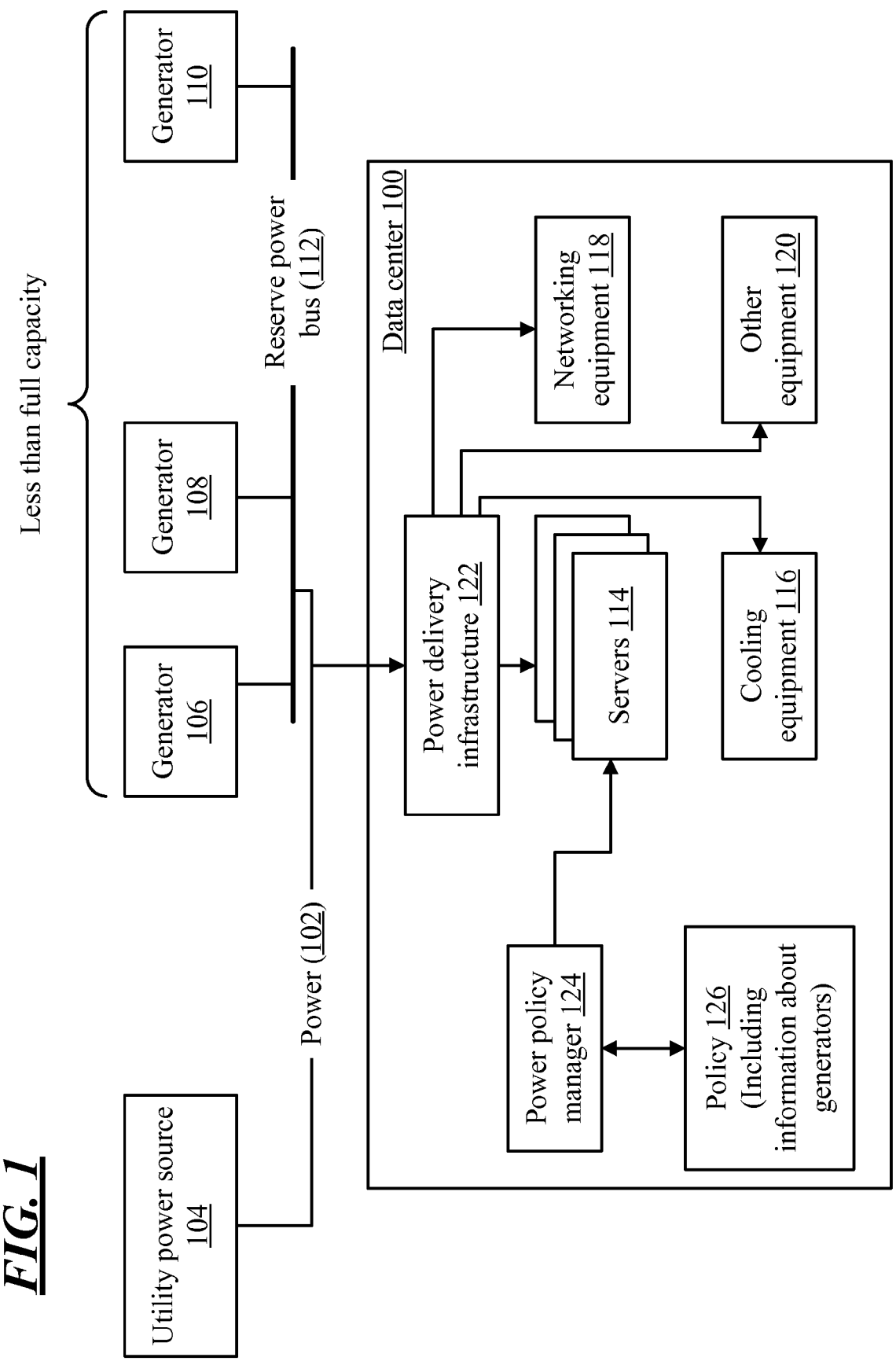
FIG. 1 is a block diagram of an example data center that uses generators for backup power.

Data centers are facilities that house servers and other types of computing equipment. A data center could take the form of a permanent structure that houses equipment, a temporary and/or portable container for such equipment, a collocation center, or any other form. Data centers may be used to house the servers that implement web sites, databases, or other types of online services. Retailers, banks, schools, governments, etc., use data centers to provide many of their computing services. The equipment and software in a data center might not be designed to be tolerant to abrupt electrical service disruptions. Since homes and offices do not normally have backup systems, home computers and consumer software are relatively tolerant to abrupt electrical service outages. In a data center, however, the expectation is that the data center will provide continuous power to the equipment, even in the event that the electrical utility fails to provide power. In order to meet this expectation, data centers typically have backup power systems, including on-site generators.

Typically, the generators are considered to be a complete replacement for the utility power. Thus, a data center typically has sufficient on-site generator capacity to carry the maximum power load that the equipment in the center will consume. Generators are expensive to buy and maintain, so keeping enough generator capacity to carry the maximum power load is expensive. However, it is difficult to configure a center with less than enough generator capacity to carry the maximum power load, since the equipment typically does not adjust its power consumption depending on whether it is running on utility power or generator power.

The subject matter described herein allows a data center to be equipped with less than enough generator capacity to carry the center's maximum load, by making considerations of generator capacity part of the data center's power policy. When the data center runs on generator power, the IT equipment in the data center (or any other equipment in the data center, such as pumps, compressors, fans, etc.) may be throttled down to a level that can be maintained by the generators. When the center is changed back to utility power, the throttle is removed.

A switch to generator power might occur for various reasons—e.g., an unexpected electrical utility outage, scheduled maintenance on the data center's connection to the utility, or a scheduled test of the data center's ability to run on generator power. In the case of an unexpected electrical utility outage, the changeover between generator and utility power may work as follows. Upon loss of utility power, an Uninterruptable Power Supply (UPS) provides temporary continuous power to the data center's equipment. (There may be plural UPS's at the data center, although for simplicity the description herein will refer to a single UPS.) While the UPS supplies power, the generators are started. Additionally, while the UPS supplies power, the power policy manager becomes aware that the system is about to start operating on generator power, and determines how much power the generators can provide. (The amount of power provided by generators may change—e.g., a generator might be taken out for service, which reduces the data center's generator capacity below the center's normal generator capacity.) The power policy manager then throttles the equipment, to reduce the equipment's power draw to the level that can be handled by the generators. This throttling occurs while the UPS supplies power to the equipment. When the generators are online and ready to provide power, the equipment begins to draw power from the generators. The change between utility/generator power and UPS power may be accomplished with one or more transfer switches, or may be accomplished by the UPS itself. Since the equipment was throttled while the UPS was supplying power, by the time the change to generator power occurs, the data center's power consumption has been throttled down to a level that can be served by the generators. When utility power is restored, the equipment may be changed back from generator power to utility power, and the throttle may be removed.

Turning now to the drawings, FIG. 1 shows an example data center 100 that uses generators for backup power. Data center 100 normally receives power 102 from a utility power source 104. There may be a plurality of generators 106, 108, and 110 that can provide power 102 to data center 100 in the event that utility power source 104 fails to provide power—e.g., in the event of an unexpected utility power outage. Generators 106-110 may be connected to a reserve power bus 112, which, in turn, is connected to data center 100, thereby allowing generators 106-110 to serve data center 100. As indicated in FIG. 1, the collective capacity of generators 106-110 may be less than the full capacity that would be drawn to satisfy the maximum power load of the equipment in data center 100.

Data center 100 may contain a power delivery infrastructure 122, which allows power from the utility power source 104 or the generators 106-110 to be distributed to the various pieces of equipment in data center 100. Power delivery infrastructure 122 may include a plurality of Uninterruptable Power Supplies (UPS), and a plurality of transfer switches. A UPS is a device that can deliver power from a stored reserve if power delivery from the utility or generators fails. Typically, a UPS stores energy chemically (in a battery) or mechanically (in a flywheel), and can deliver power temporarily while a switch is being made between utility power and generator power. Transfer switches are devices that have two power inputs and one power output. In normal operation, a transfer switch passes power along from its first input to the output. But, if power is lost at the first input, the transfer switch seamlessly transitions to the second input, and delivers power to the output from the second input. Thus, the first input of a transfer switch is typically connected to utility and/or generator power, and the second input is typically connected to a UPS. The output of the transfer switch is typically connected to the power supply of one or more pieces of equipment. Thus, if utility power is lost, the transfer switch transfers power from the utility to the UPS, and allows power to the transfer switch's loads to be delivered continuously. When generators are brought online, the generators provide power through the transfer switch's first input, so the transfer switch transitions power away from the UPS and to the generators. (It is noted that the foregoing description is an example topology, but the subject matter herein is not limited to data centers that are wired in any particular topology and/or with any particular set of components. Rather, the data centers described herein may be implemented using any appropriate topology and any appropriate set of components.)

Data center 100 may contain various types of equipment. This equipment includes servers 114, cooling equipment 116 (e.g., fans and air conditioners), networking equipment 118, and any other equipment 120. The servers are generally used to run software that interacts with the outside world (e.g., web servers), or software that serves the outward-facing servers (e.g., back-end or middle-tier software). (The term "IT equipment" may be used herein to refer to equipment such as servers, network equipment, data storage devices, etc.)

Power policy manager 124 implements the power policy for the IT equipment and other types of equipment. Power policy manager 124 may execute a policy 126, which describes how power is to be managed throughout data center 100. For example, on a hot day, policy 126 might specify that the air conditioning is to be turned to higher power, or that the IT equipment (or other equipment) is to be turned to lower power (either of which would result in a cooler center). Policy 126 may also specify rules such as that the disk drives are to be turned off after some number of minutes of inactivity, or that certain network connections are to be turned off when network traffic is low. In the subject matter herein, policy 126 may also specify how the IT equipment (or other equipment) is to be throttled depending on whether data center 100 is running on power from generators 106-110 or on power from utility power source 104.

Power policy manager 124 may have knowledge of how many generators are available. For example, a human administrator might continually update the information about how many generators are available, or power policy manager 124 might have sensors that can detect the available generator capacity. As described above, the total generator capacity that is available may be less than enough to power all of data center 100 at its maximum power load, so policy 126 may specify how that load is to be shed in view of the amount of generator capacity that is available. One way to shed the load is to throttle IT equipment (or any other type of equipment) down to a lower power level when the system is being powered by generators. Policy 126 may specify which servers are to be throttled, and what specific components on those servers are to be throttled (e.g., throttling the processor by lowering the clock speed, throttling the network card by limiting network throughput). Or, policy 126 may specify a particular way to choose which servers are to be throttled. For example, based on what applications are implemented by the different servers, different servers might be doing different amounts of work at different times. For example, a French language search engine might be doing more work during the daytime in France than during nighttime in France. Thus, if data center 100 switches to generator power at a time when it is day in California but night in France, it might make more sense to throttle the server that is running a French language search engine than one that is running the web site for a California bank. Policy 126 may take these types of factors into account when deciding which servers to throttle.

Power policy manager 124 may be software that executes on a computer that is used to control operations at data center 100. However, power policy manager 124 could be implemented in hardware, or in any other appropriate form.

Figure 2:
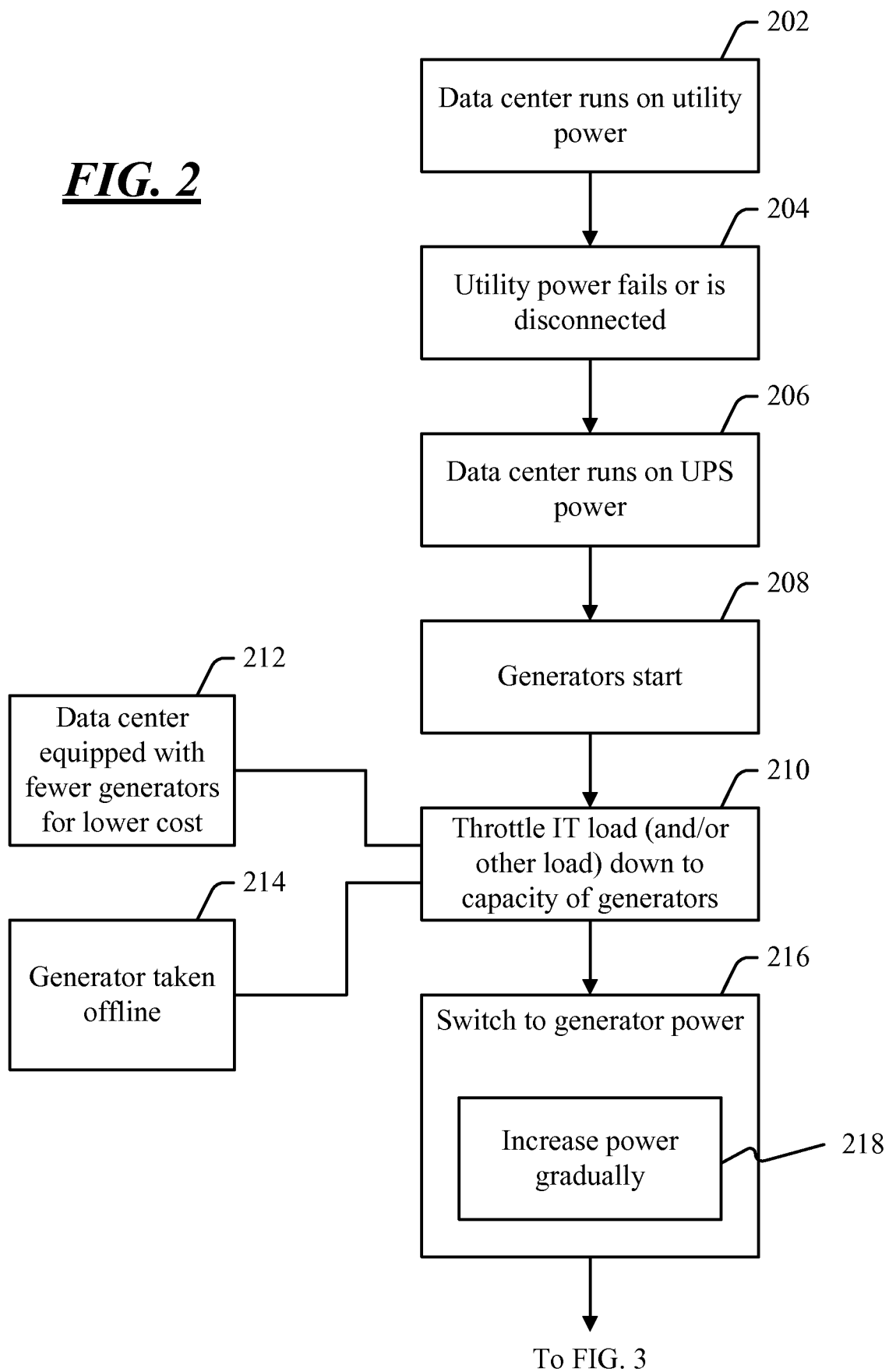
FIGS. 2 and 3 are, collectively, a flow diagram of an example process of transferring power between a utility source and one or more generators.
Figure 3:
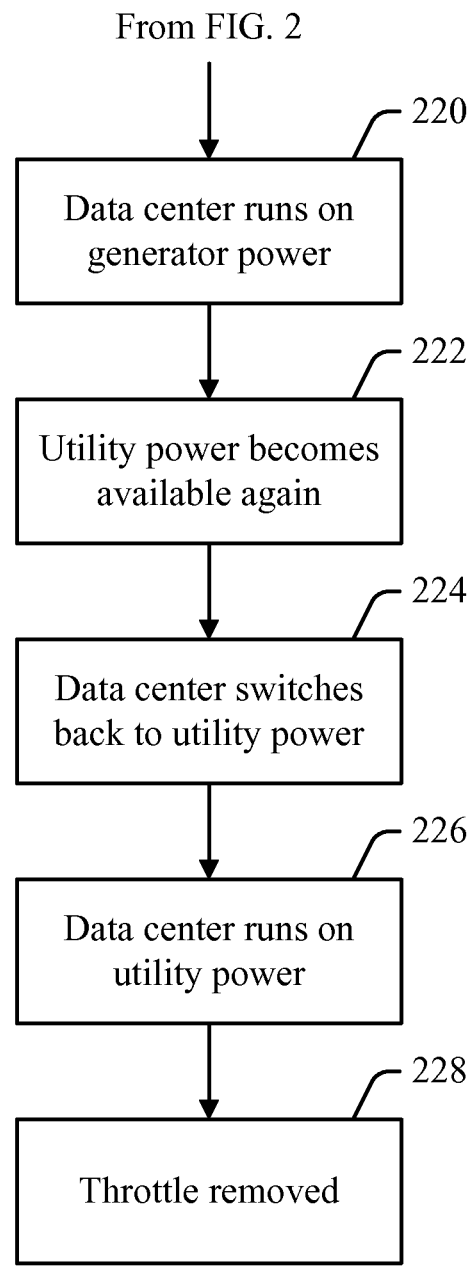

FIGS. 2 and 3 show an example process of transferring power between a utility source and one or more generators. Before turning to a description of FIGS. 2 and 3, it is noted that the flow diagram contained in FIGS. 2 and 3 is described, by way of example, with reference to components shown in FIG. 1, although the process of FIGS. 2 and 3 may be carried out in any system and is not limited to the scenario shown in FIG. 1. Additionally, the flow diagram in FIGS. 2 and 3 shows an example in which stages of a process are carried out in a particular order, as indicated by the lines connecting the blocks, but the various stages shown in these diagrams can be performed in any order, or in any combination or sub-combination.

At 202, a data center is running on utility power. At 204, the utility power ceases to provide power to the data center. For example, the electric utility that is providing the utility power may experience an unexpected, unscheduled power outage. Or, the utility may disrupt power due to scheduled maintenance. Or, as another example, the operator of the data center may want to test the data center's behavior under generator power, and thus may take the utility power source offline even though the utility is able to provide power. The failure or disconnection of utility power at 204 may happen for any reason or under any circumstances.

At 206, in the period of time immediately following disconnection or failure of utility power, the data center may operate on UPS power instead of utility or generator power. One example way to operate a data center on UPS power is through the use of transfer switches, as described above, although the UPS could deliver power through any appropriate mechanism. (It is noted that the topology described above is merely an example. The subject matter herein is not limited to data centers that are wired with any particular topology. Moreover, the subject matter herein may be implemented using any appropriate type of components, and is not limited to the specific example components described above.)

At 208, the generators for the data center start. While the generators are starting, and while the data center is being powered by one or more UPS's, the load of the equipment in the data center may be throttled down to a level that is within the capacity of the generators (at 210). This throttling may be performed, for example, by a power policy manager. The power policy manager may be connected to sensors that allow it to detect when the data center is being changed from utility power to generator power. The power policy manager may also have knowledge, at any given time, of how much generator capacity is available. (As noted above, this knowledge might be provided to the power policy manager by a human administrator, or through automatic sensors.) Thus, the power policy may determine the amount that the power load is to be reduced in order to stay within the capacity of the generators, and may throttle the load of the equipment down to that level. The generator capacity of the data center may be less than the maximum load that the data center would draw when all of its equipment is running on full power. The reason for this undercapacity of the generators might be that the data center is designed with less-than-full generator capacity in order to reduce the cost of the data center (block 212), or might be that the center has enough capacity to carry its maximum load but one or more of the generators have been taken offline at block 214 (e.g., in the case where a generator is taken offline for maintenance).

It is noted that the one or more UPS's may be able to carry the full load of the data center (but only for a few minutes or seconds), so the throttling may occur while the data center is running on UPS power. In this way, the data center is operating at a lower level by the time that the change to generator power occurs.

At 216, switch is made to generator power. At this point, the equipment in the data center is being powered by the one or more generators. At this point, the load of the equipment in the data center is low enough that the load can be served by the generators. However, in one example, non-limiting variant of the subject matter herein, the load of the equipment is taken below the capacity that could be served by the generators, and is gradually increased (at 218) while the generators are slowly brought online. Bringing the power load low, and then slowly bringing the load back up, may make the transition to generator power more stable. The act of throttling the load significantly below the generator capacity and then increasing the load gradually as the generators are brought online may be part of the power management policy. This aspect of the policy may be implemented by the power policy manager described above in connection with FIG. 1.

At 220, the data center is running on generator power. At 222, utility power becomes available again. Thus, at 224 the data center switches back to utility power, and the generators may be deactivated. With power now being provided by the utility (at 226), generator capacity is no longer a limitation on the amount of power that the data center can draw, so the throttle is removed (at 228).

Figure 4:
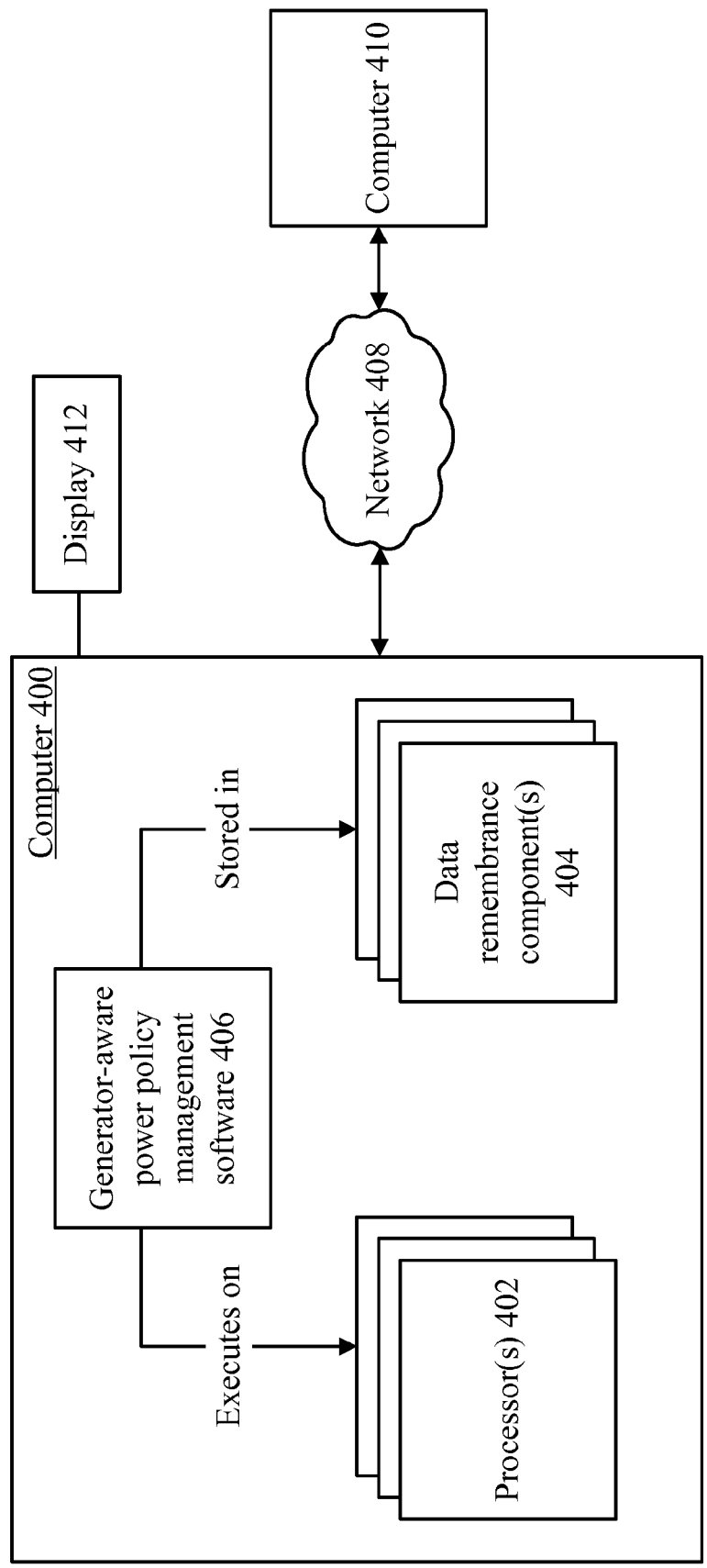
FIG. 4 is a block diagram of example components that may be used in connection with implementations of the subject matter described herein.

FIG. 4 shows an example environment in which aspects of the subject matter described herein may be deployed.

Computer 400 includes one or more processors 402 and one or more data remembrance components 404. Processor(s) 402 are typically microprocessors, such as those found in a personal desktop or laptop computer, a server, a handheld computer, or another kind of computing device. Data remembrance component(s) 404 are components that are capable of storing data for either the short or long term. Examples of data remembrance component(s) 404 include hard disks, removable disks (including optical and magnetic disks), volatile and non-volatile random-access memory (RAM), read-only memory (ROM), flash memory, magnetic tape, network-attached data storage services such as a Network Attached Storage (NAS) device or a Storage Area Network (SAN), etc. Data remembrance component(s) are examples of computer-readable storage media. Computer 400 may comprise, or be associated with, display 412, which may be a cathode ray tube (CRT) monitor, a liquid crystal display (LCD) monitor, or any other type of monitor.

Software may be stored in the data remembrance component(s) 404, and may execute on the one or more processor(s) 402. An example of such software is generator-aware power policy management software 406, which may implement some or all of the functionality described above in connection with FIGS. 1-3, although any type of software could be used. Software 406 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 4, although the subject matter described herein is not limited to this example.

The subject matter described herein can be implemented as software that is stored in one or more of the data remembrance component(s) 404 and that executes on one or more of the processor(s) 402. As another example, the subject matter can be implemented as instructions that are stored on one or more computer-readable storage media or computer-readable storage memories. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that transmit propagating signals. DVDs, flash memory, magnetic disks, etc., are examples of storage media. On the other hand, wires or fibers on which signals exist ephemerally are examples of transitory signal media.

Additionally, any acts described herein (whether or not shown in a diagram) may be performed by a processor (e.g., one or more of processors 402) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 400 may be communicatively connected to one or more other devices through network 408. Computer 410, which may be similar in structure to computer 400, is an example of a device that can be connected to computer 400, although other types of devices may also be so connected.

The subject matter herein refers to an "Uninterruptable" Power Supply (UPS). It will be understood that a UPS is a type of component that delivers power in the event that the utility power source (or other power source) fails. However, UPS's themselves are subject to failure. They can run out of stored power, or they can break, or they can experience various other types of failures that might be understood, in some context, as "interruptions." It is therefore noted that the fact that a UPS is subject to failures, or that it might fail to deliver power in various situations, does not deprive the UPS of its status as an Uninterruptable Power Supply.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of managing power load in a data center, the method comprising:
    determining that a utility power source for said data center has failed;
    changing said data center to receive power from an Uninterruptable Power Supply (UPS) instead of from said utility power source;
    while said data center is operating on said Uninterruptable Power Supply (UPS), using a power management policy to throttle servers in said data center to a power level below a collective capacity of a plurality of backup generators at said data center, said collective capacity being less than a maximum amount of power drawn by equipment in said data center;
    after said servers have been throttled, changing power for said data center from said Uninterruptable Power Supply (UPS) to said generators;
    causing said collective capacity of said generators to be less than an amount of power that is drawn by said data center under said data center's maximum load by taking a generator at said data center out of service;
    after said changing of power for said data center to said generators, determining that said utility power source is available;
    changing said data center back to said utility power source from said generators; and
    ceasing to throttle said servers.

2. The method of claim 1, wherein said throttling of said servers reduces said load below said collective capacity, and wherein the method further comprises:
    increasing a throttle on said servers gradually while said generators are brought online.

3. The method of claim 1, said data center being designed with less generator capacity than an amount of power that is drawn by said data center under said data center's maximum load.

4. The method of claim 1, said power management policy specifying which servers are to be throttled based on what software runs on the servers, or on a time of day at which throttling occurs.

5. The method of claim 1, said method being performed by a power policy manager that uses sensors to determine that said utility power source has failed and to determine said collective capacity of said generators at a time that said utility power source fails.

6. The method of claim 1, said power management policy specifying that disk drives in said data center are to be turned off after a specified number of minutes of inactivity.

7. The method of claim 1, said power management policy specifying that air conditioners in said data center are to be turned to higher power based on the temperature at said data center.

8. A data center comprising:
    a plurality of servers;
    a connection to a utility power source; and
    a power policy manager that runs on a computer in said data center, that determines that said utility power source is not providing power to said data center, that determines that a plurality of generators have been started in said data center, that determines that a collective capacity of said generators is less than an amount of power that would be drawn by said data center under said data center's maximum load, that throttles said servers to reduce load of said servers at or below said collective capacity, that switches power for said data center to power provided by said generators, and that uses sensors to determine that said utility power source has ceased to provide power to said data center and to determine said collective capacity of said generators at a time that said utility power source fails;
    there being a power policy that is implemented by said power policy manager, said power policy specifying that said servers are to be throttled when said data center is powered by said generators.

9. The data center of claim 8, wherein said power policy manager determines that said utility power source has become available and ceases to throttle said servers after power for said data center is switched back to said utility power source.

10. The data center of claim 8, wherein throttling of said servers reduces said load below said collective capacity, and wherein said power policy manager gradually increases a throttle on said servers while said generators are brought online.

11. The data center of claim 8, wherein said data center operates on Uninterruptable Power Supply (UPS) power during said throttling.

12. The data center of claim 8, wherein said power policy manager throttles said servers under a power management policy, said power management policy specifying whether a given server is to be throttled based on what software is running on said given server.

13. The data center of claim 8, wherein said data center causes use of said generators by ceasing to use said utility power source which said utility power source is available in order to test said generators.

14. The data center of claim 8, said power policy specifying that disk drives in said data center are to be turned off after a specified number of minutes of inactivity.

15. A method of managing power load in a data center, the method comprising:
 determining that a utility power source for said data center has failed;
 changing said data center to receive power from an Uninterruptable Power Supply (UPS) instead of from said utility power source;
 while said data center is operating on said Uninterruptable Power Supply (UPS), using a power management policy to throttle servers in said data center to a power level below a collective capacity of a plurality of backup generators at said data center, said collective capacity being less than a maximum amount of power drawn by equipment in said data center;
 after said servers have been throttled, changing power for said data center from said Uninterruptable Power Supply (UPS) to said generators;
 after said changing of power for said data center to said generators, determining that said utility power source is available;
 changing said data center back to said utility power source from said generators; and
 ceasing to throttle said servers,
said method being performed by a power policy manager that uses sensors to determine that said utility power source has failed and to determine said collective capacity of said generators at a time that said utility power source fails.

16. The method of claim 15, wherein said throttling of said servers reduces said load below said collective capacity, and wherein the method further comprises: increasing a throttle on said servers gradually while said generators are brought online.

17. The method of claim 15, said data center being designed with less generator capacity than an amount of power that is drawn by said data center under said data center's maximum load.

18. The method of claim 15, further comprising: causing said collective capacity of said generators to be less than an amount of power that is drawn by said data center under said data center's maximum load by taking a generator at said data center out of service.

19. The method of claim 15, said power management policy specifying which servers are to be throttled based on what software runs on the servers, or on a time of day at which throttling occurs.

20. The method of claim 15, said power management policy specifying that disk drives in said data center are to be turned off after a specified number of minutes of inactivity.

* * * * *